Patented Dec. 26, 1933

1,940,989

UNITED STATES PATENT OFFICE 1,940,989

PREPARATION OF ORGANIC ACIDS

Alfred T. Larson, Wilmington, Del., assignor, by mesne assignments, to E. I. du Pont de Nemours & Company, Wilmington, Del., a corporation of Delaware No Drawing. Application February 18, 1931
Serial No. 516,838

9 Claims. (Cl. 260—116)

This invention relates to a process for the formation of organic compounds and particularly to the preparation of monocarboxylic acids by the interaction of aliphatic alcohols and carbon monoxide in the presence of a catalyst and a carrier gas.

It is known that organic acids and esters can be prepared by the interaction, in the vapor or liquid phase, of organic compounds with the oxides of carbon. For example, it has been shown that the condensation of methyl alcohol with carbon monoxide, in the presence of a suitable catalyst, will produce acetic acid and methyl acetate in proportions governed by the particular operating conditions. Acids have likewise been formed from methane and carbon dioxide, from carbon monoxide and water, and from ethers and carbon monoxide.

In the practical operation of the above processes the problem of temperature control is an extremely critical one, for the development of heat, particularly in those processes employing carbon monoxide, introduces difficulties of importance from two standpoints.

First, unless the temperature of the reaction be carefully controlled, it may result in temperatures so high as to injure the catalyst. This is of particular consequence in case, for the sake of obtaining high yields of product, very reactive catalysts are employed; such, for example, as the adsorbent oxides including thorium oxide gel, titanium oxide gel, etc. described in the copending U. S. application of John C. Woodhouse, Ser. No. 519,275. For, as a rule, the more reactive a catalyst, the more susceptible it is to deterioration when subjected to excessive temperatures.

Second, as the reaction mixtures for the preparation of aliphatic acids are capable of yielding many compounds, the temperature of the reaction should preferably be controlled within certain rather narrow limits as there is generally a definite temperature which favors the formation of the aliphatic acid while suppressing the side-products.

It is apparent, therefore, that, broadly speaking, for the proper maintenance of catalyst activity as well as for the efficient formation of products of certain composition, it is necessary for the reaction temperature to be carefully controlled. Moreover, when condensing carbon monoxide and methanol to acetic acid, due to the exothermic nature of this reaction the difficulties above referred to are greatly aggravated. With a view to eliminating the aforementioned difficulties, an object of the present invention is to provide an improved process for the synthesis of organic acids and esters. Another object of the invention is to provide a process for the interaction of carbon monoxide and methanol while in the presence of a carrier gas whereby the temperature of the reaction may be carefully controlled. A still further object of the invention is to provide an improved process for the preparation of aliphatic acids by the interaction of alcohols with carbon monoxide present in substantially equal molal proportions.

Other objects and advantages of the invention will be apparent as they are better understood by reference to the following specification in which their details and preferred embodiments are described.

In carrying out gaseous reactions it is generally considered that the presence of non-reactants in any concentration is undesirable. The most important factors contributing to this view are the theoretically greater hourly yield and the lower equipment and power cost when gases, as free as possible from non-reactant materials, are employed. The extra cost of handling gases not required for the reaction may be considered important, especially where the process is carried out under pressure. Notwithstanding the important advantages that accrue from the use of pure reactant materials, I have found that these advantages, as applied to the various processes for the synthesis of acetic acid and its esters, are outweighed by advantages resulting from the employment of a circulatory process in which these reacting constituents are limited by employing a suitable diluent or carrier gas. By thus limiting the concentration of the reacting gases, which contact with the catalyst to from 25 to 75%, it is possible to carry out processes for the synthesis of acetic acid or other aliphatic acids and their esters with great ease as to control of the reaction temperature, with longer maintenance of catalytic activity, and with greater purity of the acid or ester produced.

An object of the invention may be attained, for example, by initially circulating in the reaction system a body of suitable carrier gas, and preferably one that has no inhibiting action on the particular reaction employed, e. g. nitrogen or methane. The catalyst is brought to reaction temperature in an atmosphere of the circulating medium and to this latter there is then introduced the carbon monoxide and the appropriate alcohol vapor, in such amount that their combined concentration will preferably range between 25 and 75%. This method of initiating the reaction will prevent certain rises in the temperature of the catalyst that are commonly encountered when the catalyst is brought to reaction temperature in an atmosphere of the materials that are to react. After reaction, the products are removed from the gases and the residual gases, with suitable addition of the carbon monoxide and alcohol, are returned to the reaction apparatus for further treatment.

Since methane may increase in its concentration in the carrier gas, due to the breakdown of methanol, it is accordingly necessary to periodically or continuously withdraw from the circulatory system an appropriate amount of the residual gases, preferably after separation of the formed products, in order that the methane may be removed therefrom. By suitably adjusting the amount of gases so withdrawn, and regulating the proportions of alcohol and carbon monoxide added to the reaction, the desired constant proportion of the carrier gas to the reactants can be readily maintained. Alternatively, if fluctuations in the reaction temperature occur, for any reason, such, for instance, as those due to non-uniformity of the reactant gaseous composition, they can be held within the critical temperature range for the particular reaction by controlling the proportion of inert gas to reacting gas circulated over the catalyst.

The recirculation process of this invention is applicable to processes for the preparation of organic compounds containing a negative radical of an aliphatic acid, viz. acetic acid, propionic acid, methyl acetate, ethyl propionate, etc. Moreover, when preparing such compounds the advantages obtained by using a carrier gas may be further augmented by maintaining the ratio of the reactants within prescribed limits. Catalytic gaseous reactions such as the interaction of carbon monoxide and methanol are believed to proceed not entirely in accord with the laws of mass action but on the contrary, as they relate to surface reactions, proceed to completion more readily if the correct stoichiometrical proportion of the reactants contacting with the catalyst is employed. Thus, by maintaining a proportion of the alcohol and carbon monoxide, when preparing the aliphatic acids, in substantially equal molal proportions, relatively better yields of the acid are obtained than when using an excess of either of the reactants. By varying the molal percent. of the carbon monoxide from 40:60 and the methanol over a corresponding alternate range from 60:40, good yields will be obtained although it is preferable, for the sake of increase in yield, to adhere more closely to the stoichiometrical proportions.

Although the invention is susceptible of embodiments in many forms which may differ as to conditions of operation as well as to materials and apparatus employed, the following example will serve to illustrate one method of applying the invention to the synthesis of acetic acid and its esters.

The apparatus consists of a compressor, of which the parts contacting with the gases to react are constructed of materials which are not readily attacked by acetic acid, the compressor being adapted to bring the gases to the pressure at which the reaction is effected; a reaction apparatus in which is disposed a catalyst suitable for the synthesis of acetic acid, a condenser, a receiver for collecting the condensed products of the reaction, and a regulating pump. The reaction apparatus, condenser, receiver, and circulating pump are connected in a series circuit in the order named and through this system is circulated continuously a body of methane under a pressure of 700 atmospheres. The catalyst, which may consist of thorium oxide gel is heated initially to reaction temperature by electrical means, and it having attained that temperature, a gaseous mixture containing approximately equal molal proportions of carbon monoxide and methanol compressed to 700 atmospheres, is gradually admitted to the circulatory system, where, mixed with the circulating methane, it is passed at a temperature of approximately 350° C. in contact with the acetic acid forming catalyst disposed in the reaction apparatus. The carbon monoxide and methanol combine to form acetic acid and/or methyl acetate, which is/are condensed in the condenser and collected in the receiver. The residual gases are returned by the circulatory pump to the reaction apparatus, where, together with additional portions of the mixture containing the methanol and carbon monoxide and methane the gases undergo further reaction to produce the acetic acid and/or its esters. Provision is made for continuously withdrawing residual gas from the system at a point between the receiver and the circulatory pump. When the reaction has gotten under way, the quantity of residual gas so withdrawn and the quantity of carbon monoxide and methanol added to the system are regulated, at all times, so that the carbon monoxide and methanol concentration contacting with the catalyst is substantially uniform.

After the catalyst has been initially heated to reaction temperature, the electrical heating is in part or wholly dispensed with, as may be desired, and the temperature of the reaction is thereafter controlled for the most part by regulating the concentration of the carrier gas employed.

From a consideration of the above disclosure, it will be realized that various reactants may be catalytically converted into organic compounds containing a negative radical of an aliphatic acid, and all such reactions will come within the scope of the invention if they employ a carrier gas to control the reaction temperature and/or effect the reaction utilizing a substantially equal molal proportion of the gaseous reactants.

I claim:

1. A process for effecting exothermic organic synthesis in the vapor phase which comprises heating a catalyst adapted for said synthesis to reaction temperature in an atmosphere of a circulating gaseous medium incapable per se of forming the organic compound under the conditions prevailing, thereafter continuously adding to said medium a mixture of the gases for the reaction, passing the resulting gaseous mixture over said catalyst, removing the organic products formed and recirculating the uncombined gases over the catalyst, while maintaining a substantially uniform concentration of the inert gases during contact with the catalyst by withdrawal of portions of the circulating mixture and replacement thereof with fresh mixtures of gases for the reaction.

2. A process for effecting exothermic organic synthesis in the vapor phase which comprises heating a catalyst adapted for said synthesis to reaction temperature in an atmosphere of a circulating gaseous medium incapable per se of forming the organic compound under the conditions prevailing, thereafter continuously adding to said medium a mixture of the gases for the reaction, passing the resulting gaseous mixture over said catalyst, removing the organic products formed and recirculating the uncombined gases over the catalyst, while maintaining the optimum temperature for the synthesis by controlling the proportion of the inert gas to the reacting gases circulated.

3. A process for effecting exothermic organic synthesis in the vapor phase which comprises heating a catalyst adapted for said synthesis to reaction temperature in an atmosphere of a circulating gaseous medium incapable per se of forming the organic compound under the conditions prevailing, thereafter continuously adding to said medium a mixture of the gases for the reaction, in substantially stoichiometrical proportions corresponding to the compounds to be synthesized, passing the resulting gaseous mixture over said catalyst, removing the organic products formed and recirculating the uncombined gases over the catalyst, while maintaining a substantially uniform concentration of the inert gases during contact with the catalyst by withdrawal of portions and replacement thereof with fresh mixtures of gases for the reaction.

4. A process for the preparation of organic compounds containing a negative radical of an aliphatic acid which comprises continuously contacting with a heated catalyst a gaseous mixture of carbon monoxide and an aliphatic alcohol containing a high concentration of gases not required for the reaction, removing products of the reaction and recirculating the uncombined gases over the catalyst while maintaining a gaseous mixture containing a molal percent. of alcohol within the range of 60% to 40% and the carbon monoxide over a corresponding alternate range from 40% to 60% by continuous withdrawal of portions and replacement thereof by fresh carbon monoxide and alcohol.

5. A process for the preparation of organic compounds containing a negative radical of an aliphatic acid which comprises continuously contacting with a heated catalyst a gaseous mixture of carbon monoxide and an aliphatic alcohol containing from 25 to 75% of an inert gas not required for the reaction, removing products of the reaction and recirculating the uncombined gases over the catalyst, while maintaining a substantially uniform concentration of the reacting gaseous mixture by continuous withdrawal of portions and replacement thereof by fresh carbon monoxide and alcohol.

6. A process for the synthesis of acetic acid which comprises heating a catalyst adapted for said synthesis to reaction temperature in an atmosphere of a circulating medium incapable per se of forming acetic acid under the conditions of operation, thereafter continuously adding to said medium a mixture of carbon monoxide and vaporized methanol, passing the resulting gaseous mixture over said catalyst, removing the acetic acid formed and recirculating the uncombined gases over the catalyst, while maintaining a substantially uniform concentration of inert gases during contact with the catalyst by withdrawal of portions of the circulating mixture and replacement thereof with fresh mixtures of gases for the reaction.

7. A process for the synthesis of acetic acid which comprises heating a catalyst adapted for said synthesis to a temperature of approximately 350° C. in an atmosphere of circulating methane, thereafter continuously adding to the methane a mixture of carbon monoxide and vaporized methanol, passing the resulting gaseous mixture over the catalyst, removing the acetic acid, as well as other organic compounds containing a negative radical of an aliphatic acid formed, and recirculating the uncombined carbon monoxide and vaporized methanol together with the methane over the catalyst, while maintaining a substantially equal molal concentration of the reactants in the gaseous mixture contacting with the catalyst.

8. A process for the preparation of organic compounds containing a negative radical of an aliphatic acid, which comprises heating a catalyst adapted for said synthesis to reaction temperature in an atmosphere of a circulating gaseous medium incapable per se of forming the aliphatic acid under the conditions prevailing, thereafter continuously adding to said medium a mixture of carbon monoxide and an aliphatic alcohol, passing the resulting gaseous mixture over said catalyst, removing the organic product formed, and recirculating the uncombined gases over the catalyst, while maintaining a substantially uniform concentration of the inert gases during contact with the catalyst by withdrawal of portions of the circulating mixture and replacement thereof with a fresh mixture of gases containing the carbon monoxide and aliphatic alcohol.

9. A process for the preparation of organic compounds containing a negative radical of an aliphatic acid which comprises heating a catalyst adapted for said synthesis to reaction temperature in an atmosphere of a circulating gaseous medium incapable per se of forming the organic compounds under the conditions prevailing, thereafter continuously adding to said medium a mixture of gases for the reaction, passing the resulting gaseous mixture over said catalyst, removing the organic products formed, and recirculating the uncombined gases over the catalyst, while maintaining a substantially equal molal concentration of the reactants in the gaseous mixture contacting with the catalyst.

ALFRED T. LARSON.